(12) United States Patent
Munroe

(10) Patent No.: US 7,885,298 B2
(45) Date of Patent: Feb. 8, 2011

(54) METHOD AND APPARATUS FOR PRODUCING ARBITRARY PULSETRAINS FROM A HARMONIC FIBER LASER

(75) Inventor: Michael J. Munroe, Eugene, OR (US)

(73) Assignee: Deep Photonics Corporation, Vancouver, WA (US)

( * ) Notice: Subject to any disclaimer, the term of this patent is extended or adjusted under 35 U.S.C. 154(b) by 2 days.

(21) Appl. No.: 12/354,458

(22) Filed: Jan. 15, 2009

(65) Prior Publication Data

US 2009/0185588 A1    Jul. 23, 2009

Related U.S. Application Data

(60) Provisional application No. 61/021,584, filed on Jan. 16, 2008.

(51) Int. Cl.
*H01S 3/10* (2006.01)
*H01S 3/00* (2006.01)

(52) U.S. Cl. .......................... 372/22; 372/21; 372/38.02

(58) Field of Classification Search ............. 372/21–22, 372/38.1, 38.02; 359/326, 328
See application file for complete search history.

(56) References Cited

U.S. PATENT DOCUMENTS 7,508,575 B2 * 3/2009 Papernyi et al. ............. 359/334
2003/0160034 A1 * 8/2003 Filgas et al. ............ 219/121.68
2005/0254819 A1 * 11/2005 Ota ............................ 398/79
2006/0002715 A1 * 1/2006 Igarashi et al. ............... 398/152
2006/0209394 A1 * 9/2006 Papernyi et al. ......... 359/341.33
2008/0013163 A1 * 1/2008 Leonardo et al. ........ 359/341.31
2009/0059969 A1 * 3/2009 Huang ......................... 372/18

* cited by examiner

*Primary Examiner*—Minsun Harvey
*Assistant Examiner*—Phillip Nguyen
(74) *Attorney, Agent, or Firm*—Townsend and Townsend and Crew LLP

(57) ABSTRACT

A system for producing frequency converted light includes a first seed laser operable to provide a first laser signal and a second seed laser operable to provide a second laser signal. The system also includes an optical combiner optically coupled to the first seed laser and the second seed laser. The optical combiner is operative to combine the first laser signal and the second laser signal into a combined laser signal. The system further includes a power amplifier optically coupled to the optical combiner. An intensity of both the first laser signal and the second laser signal are increased by the power amplifier. The system additionally includes a harmonic converter optically coupled to the power amplifier.

30 Claims, 12 Drawing Sheets

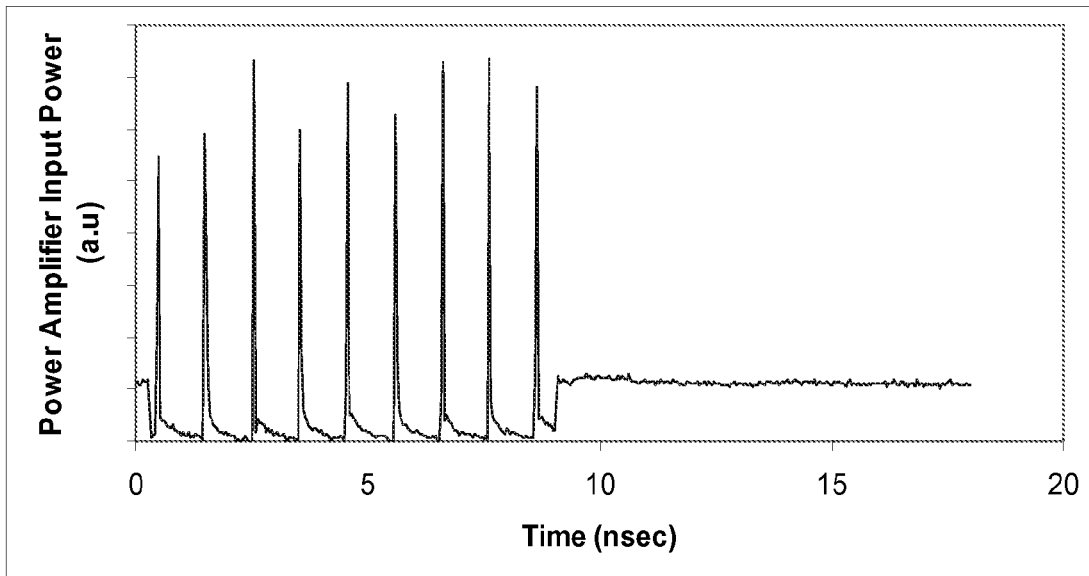
FIG. 5B (i)
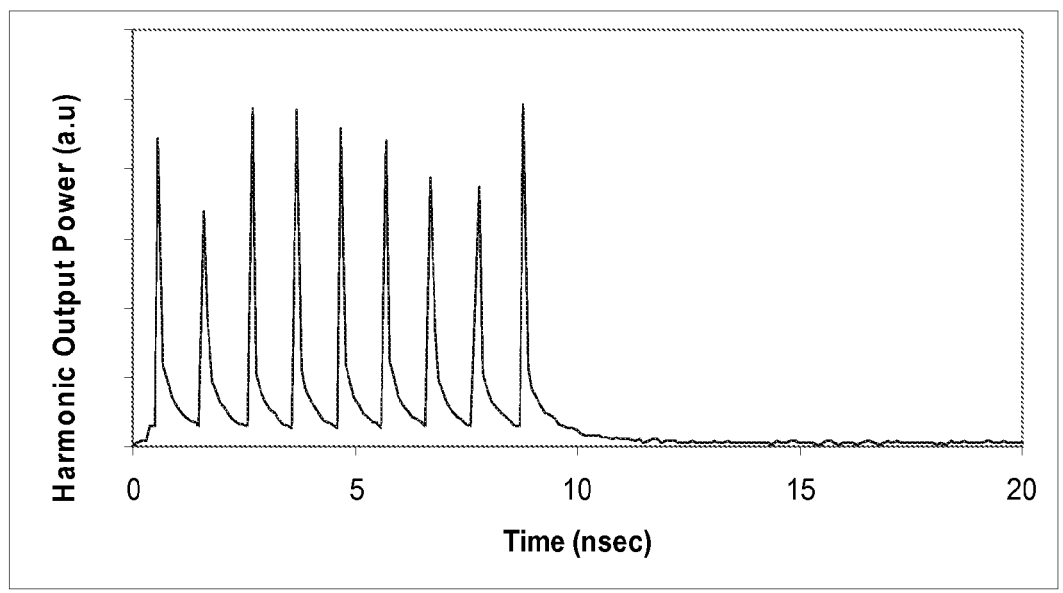
FIG. 5B (ii)

METHOD AND APPARATUS FOR PRODUCING ARBITRARY PULSETRAINS FROM A HARMONIC FIBER LASER

CROSS-REFERENCES TO RELATED APPLICATIONS

This present application claims priority to U.S. Provisional Patent Application No. 61/021,584, filed on Jan. 16, 2008, the disclosure of which is hereby incorporated by reference in its entirety for all purposes.

BACKGROUND OF THE INVENTION

This invention relates generally to high performance laser systems. Merely by way of example, an embodiment of the present invention includes pulsed fiber laser sources that emit temporal pulses shorter than 10 ns with high peak power, narrow spectral linewidth, and arbitrary pulsetrains suitable for frequency conversion. However, the scope of the present invention is broader than this application and includes other laser systems.

In some laser systems, a master-oscillator, power amplifier architecture is utilized in conjunction with a frequency conversion stage. The master oscillator emits a periodic train of temporally short, low power pulses. In some instances these pulses may have been stretched by applying a linear chirp in order to reduce nonlinearities in the fiber amplifier. This emission is coupled into a saturated fiber amplifier that emits a pulsetrain with the same temporal shape, but at higher powers. The output of the power amplifier then enters into a frequency conversion stage that emits light of a different wavelength generated by propagation through one or more nonlinear optical media.

In order to maximize output/input power efficiency, power amplifiers are generally operated in the highly saturated regime of amplification. If the relaxation lifetime of the gain (e.g. ~100 microseconds to several milliseconds with Yb-doped gain fiber) is much longer than the pulse period of the master oscillator input signal, the gain cannot dynamically respond to the time variations of the input signal. Consequently, the gain of the amplifier responds as though the input signal is continuous wave (CW), and the average output power of the amplifier is only dependent on the average input power from the master oscillator. In the case of very high saturation, the output power is only weakly dependent on the input average power. In practice, the input average power can be varied by as much as 10 dB with little effect on the output average power.

This saturated amplifier behavior can be used to increase the output pulse energy by reducing the repetition rate. Since the same amount of average power will be delivered at a reduced repetition rate, it follows that the pulse energy (and pulse peak power) of the output light increases as the repetition rate decreases.

A negative aspect of saturated amplification is that if the seed power is decreased or eliminated altogether, the inversion of the gain medium will increase dramatically on the timescale of the gain relaxation rate. With this higher inversion comes a higher gain, often resulting in the amplifier lasing due to weak back-reflections or large amounts of amplified spontaneous emission being generated. Both phenomena result in large amounts of power propagating in both directions in the amplifier, often resulting in damage of optical components. Furthermore, high inversion in a Yb-doped gain fiber can result in accelerated rates of detrimental photodarkening of the gain fiber.

Another deleterious effect of a sub-saturated power amplifier is its behavior when the master oscillator pulsetrain is restarted. The first several master oscillator pulses that are injected into the power amplifier are amplified by very high gain, since the inversion is higher than when the amplifier is saturated. The gain can be up to 30 dB greater than when the master oscillator is operating in saturated mode. Thus, these "leading pulses" will contain very high peak power and often result in optical damage to the amplifier or harmonic conversion stages of the laser system. Furthermore, if the inversion increases in the power amplifier, the pump absorption will decrease causing components downstream from the pumping lasers to be exposed to very high average powers. This may cause failure to these components.

Many applications for fiber lasers require the ability to arbitrarily turn pulsetrains on or off. In order to protect the laser system, the pumping power to the fiber amplifier is generally decreased or completely removed during the time that pulses from the laser are absent. This ensures that the fiber amplifier will operate only when emission pulses from the master oscillator are present. However, modulating pump lasers for the amplifier dramatically slows process work time due to thermal issues and long response times of the high power pump lasers. Other laser systems attempt to modulate the emission of continuous train of pulses and gate them after the laser with a shutter-like apparatus. At higher speeds and higher powers, this method becomes impractical. Thus, there is a need in the art for improved methods and systems for fiber lasers.

SUMMARY OF THE INVENTION

The novel apparatus and method described herein provides arbitrary modulation of frequency-converted laser pulses from a master oscillator/fiber amplifier laser system that operates with high efficiency and without self-damage. The system does not require a shuttered output or modifications to the amplifier pump power in order to turn on and off the harmonic emission from the laser system. In an embodiment, when a zero harmonic laser output is desired from the system, the master oscillator alters its emission by a means to supply enough average power to maintain fiber power amplifier saturation while the harmonic conversion stage is brought to very low efficiency. By designing the nonlinear optical conversion stage to work in concert with the master oscillator, embodiments of the present invention quickly alter the operational parameter space of the laser system such that the desired output is arbitrarily brought to near zero emission without causing self-damage.

The emission characteristics that can decrease the efficiency of harmonic conversion include, but are not limited to, peak power, polarization, and wavelength. While the power amplifier is kept in saturation, the harmonic conversion stage acts as the shutter due to the changing conversion efficiency caused by the changing emission characteristics of the master oscillator. The emission characteristics of the master oscillator can be changed very quickly in a variety of ways as will be detailed herein. In this way the master oscillator will be kept in a lower gain, saturated state when no harmonic pulses are emitted, eliminating many of the detrimental effects discussed previously. When harmonic pulses need to be emitted from the laser system again, the master oscillator changes its emission characteristics back to produce light with a higher harmonic conversion efficiency.

The transition time between the two modes of operation must generally be less than the response time of the gain medium. While the timescale for spontaneous emission in Yb is ~1 ms, the relaxation of the gain is much faster due to amplified spontaneous emission, on the order of 100 μs. Thus, the transition time between the two modes should be less that its gain relaxation time, <100 μs. If other gain media are used, for example Er- or Th-doped gain fibers, the differing relaxation times of these dopants are taken into consideration. One of ordinary skill in the art would recognize many variations, modifications, and alternatives.

According to an embodiment of the present invention, a method and fiber-based apparatus for producing arbitrary pulsetrains of harmonic light generated from the emission of a fiber laser is provided. The method described herein allows for the arbitrary starting, stopping, and restarting of the pulsed light source while the fiber laser remains in a continuous saturated state. This method ensures the preservation and safety of the fiber laser by maintaining a saturated state even when output pulses of harmonic light are not to be generated by the master oscillator injecting a modified signal into the laser that because of wavelength, peak power, polarization, or duty cycle will produce minimal harmonic light after amplification in the fiber amplifier but will keep the fiber laser in saturation.

According to a specific embodiment of the present invention, a system for producing frequency converted light is provided. The system includes a seed laser operable to provide a seed laser signal characterized by either a pulsed or CW temporal profile and a power amplifier optically coupled to the seed laser and operable to provide an amplified seed laser signal. The system also includes a harmonic converter optically coupled to the power amplifier and a controller coupled to the seed laser and operable to select either the pulsed or CW temporal profile. An average power of the amplified seed laser signal is substantially constant for both the pulsed and CW temporal profiles.

According to another specific embodiment of the present invention, a system for producing frequency converted light is provided. The system includes a first seed laser operable to provide a first laser signal and a second seed laser operable to provide a second laser signal. The system also includes an optical combiner optically coupled to the first seed laser and the second seed laser. The optical combiner is operative to combine the first laser signal and the second laser signal into a combined laser signal. The system further includes a power amplifier optically coupled to the optical combiner. An intensity of both the first laser signal and the second laser signal are increased by the power amplifier. The system additionally includes a harmonic converter optically coupled to the power amplifier.

According to yet another specific embodiment of the present invention, a method of providing a frequency converted output is provided. The method includes providing a pulsed master oscillator signal, amplifying the pulsed master oscillator signal, and frequency converting the pulsed master oscillator signal to provide the frequency converted output characterized by an intensity. The method also includes modifying the pulsed master oscillator signal into a CW master oscillator signal and reducing the intensity of the frequency converted output.

According to an embodiment of the present invention, a method of producing a frequency converted output is provided. The method includes providing a first pulsed seed signal, providing a second seed signal, and combining the first pulsed seed signal and the second seed signal to provide a combined laser output. The method also includes amplifying the combined laser output to provide an amplified combined laser output characterized by an average power, frequency converting at least a portion of the amplified combined laser output, and modifying the first pulsed seed signal. The average power is maintained at a substantially constant level.

According to yet another embodiment of the present invention, a method of producing a frequency converted output is provided. The method includes providing a first pulsed seed signal and providing a second seed signal characterized by an average power. The method also includes combining the first pulsed seed signal and the second seed signal to provide a combined laser signal. The method further includes reducing the average power of the second seed laser output and frequency converting the first seed laser output to produce the frequency converted output.

According to a particular embodiment of the present invention, a system for producing frequency converted light is provided. The system includes a first seed laser operable to provide a first laser signal and a second seed laser operable to provide a second laser signal. The system also includes an optical switch optically coupled to the first seed laser and the second seed laser. The optical switch is operative to transmit either the first laser signal or the second laser signal. The system further includes a power amplifier optically coupled to the optical switch and a harmonic converter optically coupled to the power amplifier. The optical switch may include a Mach-Zehnder modulator.

According to another particular embodiment of the present invention, a method of providing a frequency converted output is provided. The method includes providing a first pulsed seed signal, providing a second seed signal, and transmitting the first pulsed seed signal through an optical switch. The method also includes frequency converting the first pulsed seed signal to provide the frequency converted signal and transmitting the second seed signal through the optical switch. The method further includes reducing the intensity of the frequency converted signal. In an embodiment, the first pulsed seed signal includes laser radiation at about 1064 nm and the second seed signal includes laser radiation at about 1060 nm. The optical switch may includes a Mach-Zehnder modulator. In a specific embodiment, the method also includes actuating a controller to transmit the second seed signal through the optical switch.

According to yet another particular embodiment of the present invention, a system for producing frequency converted light is provided. The system includes a seed laser operable to provide a first laser signal and a polarization modulator optically coupled to the seed laser. The system also includes a power amplifier optically coupled to the polarization modulator and a harmonic converter optically coupled to the power amplifier. The polarization modulator may include a Pockels cell.

According to still another particular embodiment of the present invention, a method of providing a frequency converted output is provided. The method includes providing a seed laser signal characterized by a polarization state and transmitting the seed laser signal through a polarization modulator. The method also includes frequency converting the seed laser signal to provide a frequency converted output having an intensity, modifying the polarization state of the seed laser signal to a second polarization state, and reducing the intensity of the frequency converted output. In an embodiment, the seed laser signal includes laser radiation at about 1064 nm and the second seed signal includes laser radiation at about 1060 nm. The polarization state may include linear polarization. The polarization state and the second polarization state may be characterized by an angular difference.

Numerous benefits are achieved using the present invention over conventional techniques. For example, an embodiment according to the present invention provides a laser that can output packets of pulses that are triggered by an external signal when needed. Such laser is of great utility in micromachining applications such as via drilling when no laser output is desired as the target is being moved. Another benefit is to enable quick independent adjustment of the peak power and repetition rate of the output emission in a micromachining laser, which may be necessary when laser drilling through a variety of material layers that have different material properties. Depending upon the embodiment, one or more of these benefits may exist. These and other benefits have been described throughout the present specification and more particularly below.

BRIEF DESCRIPTION OF THE DRAWINGS

FIG. 5B shows data obtained using a laser system with two seed lasers according to an embodiment of the present invention;

DETAILED DESCRIPTION OF THE SPECIFIC EMBODIMENTS

Embodiments of the present invention provide a harmonic fiber laser system with arbitrarily-controlled pulsetrains that is enabled by manipulating the optical characteristics of the master oscillator stage in conjunction with the NLO frequency conversion stage. The frequency conversion process serves as a very effective modulator: its efficiency relates to peak power, requires a well-defined polarization state, and necessitates a spectral bandwidth of less than a few nanometers. Note that the master oscillator may contain multiple seed lasers and multiple stages of amplification. Similarly, the power amplifier may contain multiple stages of amplification. The harmonic conversion stage may contain multiple stages of frequency conversion, including but not limited to second harmonic generation, third harmonic generation, fourth harmonic generation, sum frequency mixing, difference frequency mixing, or the like. By determinately and rapidly thwarting the sensitive conditions for efficient NLO frequency conversion with the operational parameters of the master oscillator stage, the fiber laser system's harmonic output is safely modulated at high powers.

Figure 1:
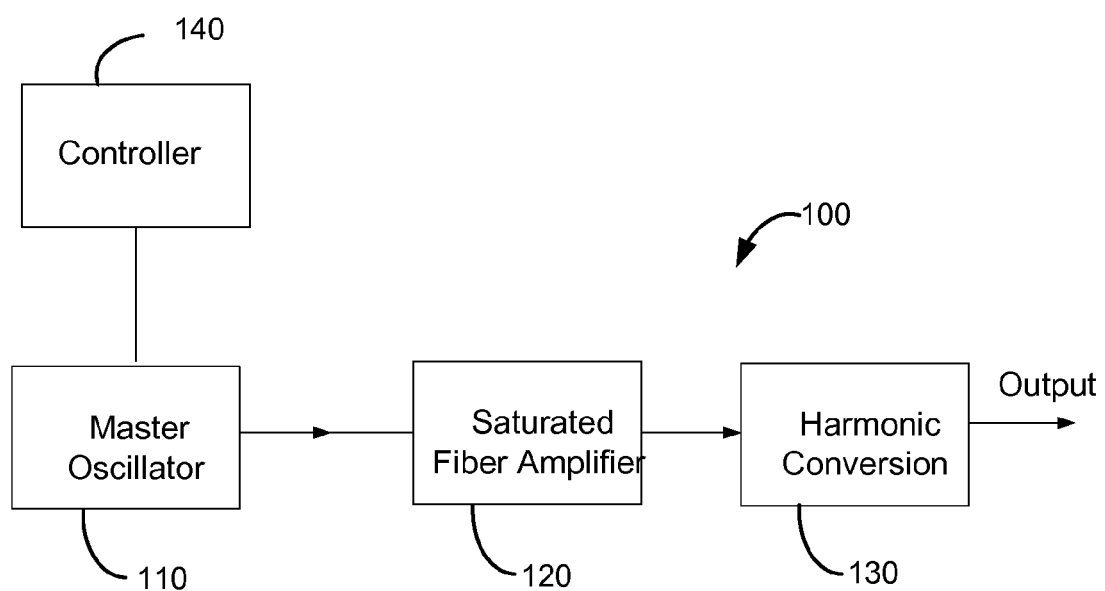
FIG. 1 is a simplified schematic of a harmonic fiber laser with a master-oscillator/power amplifier architecture and a harmonic conversion stage according to an embodiment of the present invention.

One fast modulation method changes the emission of the master oscillator from pulsed to CW emission without changing the average power emitted from the master oscillator. Since the average power input into the power amplifier section does not change, the amplifier will remain in saturation and the average output power of the amplifier will not change. However, the peak power of the amplifier emission decreases when the seed is running in CW mode. This decrease in peak power decreases the conversion efficiency in the harmonic conversion stage such that the harmonic output of the laser is decreased to a negligible power. In embodiments of the present invention, an amplifier is considered to be operating in saturation if the output of the amplifier changes less than 1 dB with a change of input power of 3 dB. FIG. 1 illustrates a harmonic fiber laser system with a master-oscillator, power amplifier architecture, with light coupled into a nonlinear optical (NLO) frequency converter. Light from the master oscillator 110 is optically coupled to the fiber amplifier 120 operating in a saturated regime. The amplified signal from the fiber amplifier 120 is optically coupled to the harmonic conversion stage 130, which typically includes an NLO frequency converter.

A controller 140 is provided in electrical communication with the master oscillator 110. As described more fully throughout the present specification, the controller is operable to modify the emission properties of the master oscillator including the pulse amplitude, the pulse width, the average power, and the like. In some embodiments, the controller is used to modify the output of the master oscillator from a pulsed mode of operation to a CW or quasi-CW mode of operation. One of ordinary skill in the art would recognize many variations, modifications, and alternatives.

Figure 2A:
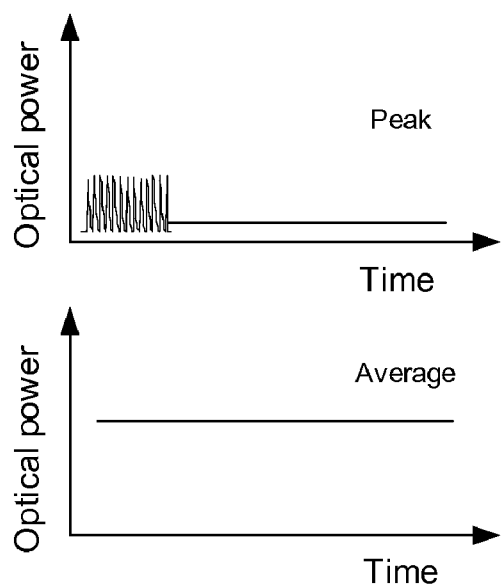
FIG. 2A is a plot of average power and peak power output from the power amplifier illustrated in FIG. 1 according to an embodiment of the present invention.
Figure 2B:
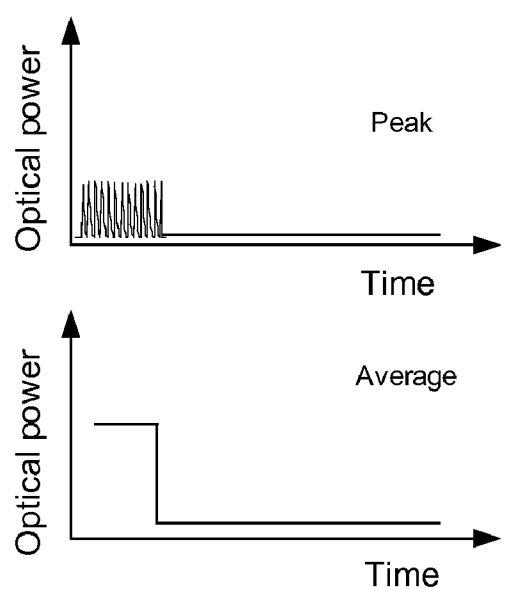
FIG. 2B is a plot of average power and peak power output from the harmonic conversion stage illustrated in FIG. 1 according to an embodiment of the present invention.

FIG. 2A shows a plot of the average power and peak power of the power amplifier emission as the master oscillator transitions from pulsed to CW mode. FIG. 2B shows the resulting harmonic output average and peak power. As illustrated in FIG. 2A, as the master oscillator transitions from pulsed to CW mode, the peak power in the pulses drops to a CW level. However, the average power output from the power amplifier 120 remains at a substantially constant level. In contrast with the output from the power amplifier, the average power from the harmonic conversion stage 130 drops significantly when the master oscillator transitions from pulse to CW mode. Because the harmonic conversion efficiency is strongly dependent (a non-linear relationship) on the intensity of the light present in the nonlinear conversion element (e.g., a nonlinear crystal), the decrease in the peak power of the light from the master oscillator results in a significant decrease in the output power provided at the frequency converted wavelength.

Figure 3:
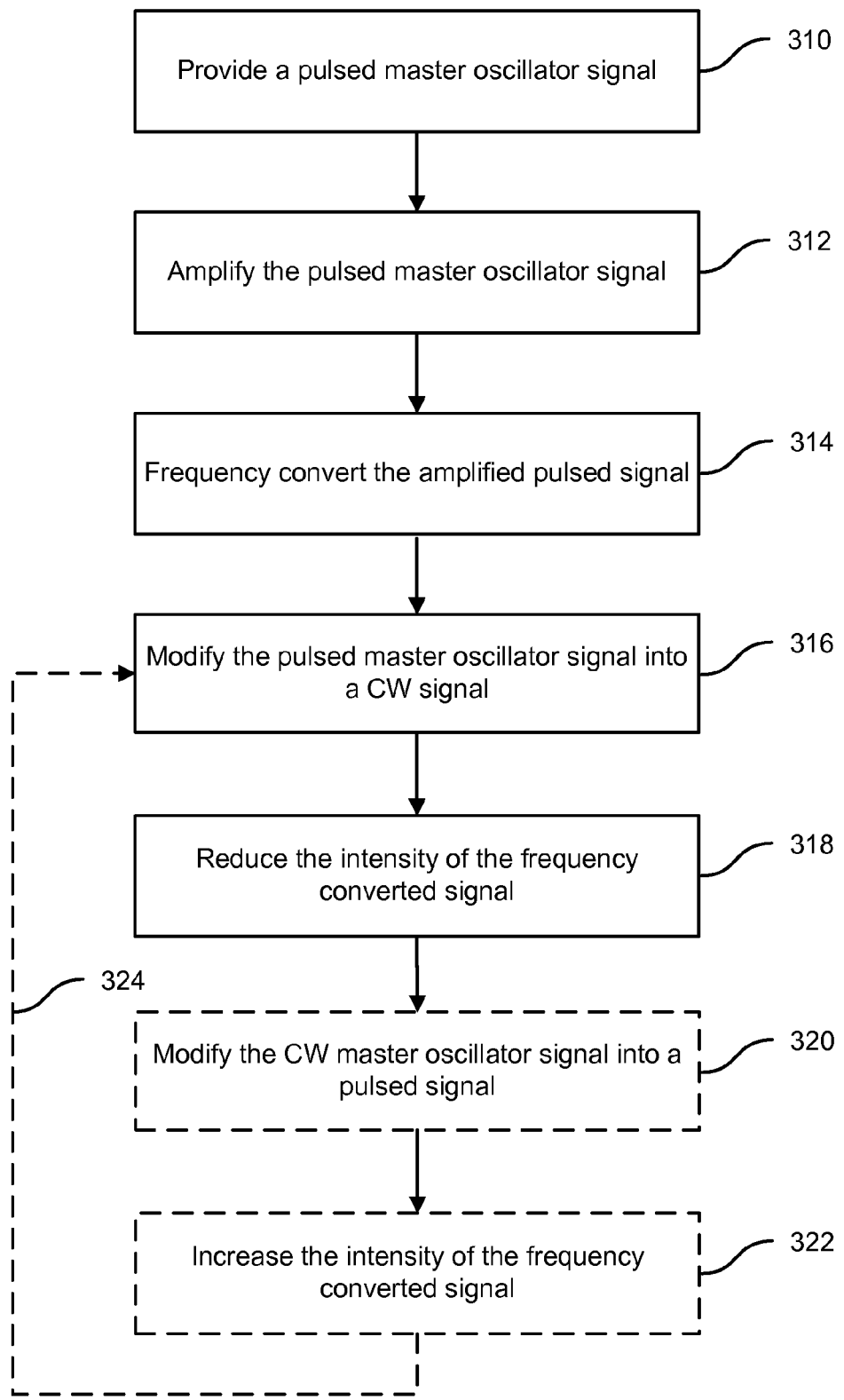
FIG. 3 is a simplified flowchart illustrating a method of providing a frequency converted output according to a specific embodiment of the present invention.

FIG. 3 is a simplified flowchart illustrating a method of providing a frequency converted output according to a specific embodiment of the present invention. A pulsed master oscillator signal is provided (310). A master oscillator 110 as illustrated in FIG. 1 may be utilized to provide this signal. The master oscillator signal is amplified (312) to increase the peak power of the pulses as well as the average power of the signal at the fundamental wavelength. A fiber amplifier 120 operated in the saturated regime as illustrated in FIG. 1 may be utilized to perform the amplification. The amplified pulsed signal is frequency converted, for example, frequency doubled, frequency tripled, or the like (314). A harmonic conversion stage 130 as illustrated in FIG. 1, which may include an NLO crystal, may be utilized to frequency convert the amplified pulses.

In order to "turn off" the frequency converted signal, the pulsed master oscillator signal is modified to a CW signal (316). As illustrated in FIG. 2B, the harmonic output resulting from a CW input signal decreases significantly in comparison to the harmonic output resulting from a pulsed input signal. Thus, upon modification to the CW input signal, the signal intensity at the converted wavelength decreases (318). Optional steps of modifying the CW input signal to a pulsed signal (320) results in an increase in the intensity of the frequency converted signal (322). In an optional process, the various processes of modifying the pulsed master oscillator signal into the CW and back into pulsed domain can be repeated as desired (324). One of ordinary skill in the art would recognize many variations, modifications, and alternatives.

It should be appreciated that the specific steps illustrated in FIG. 3 provide a particular method of providing a frequency converted output according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple substeps that may be performed in various sequences as appropriate to the individual step. Furthermore, additional steps may be added or removed depending on the particular applications. One of ordinary skill in the art would recognize many variations, modifications, and alternatives.

As an example of a system and method for providing converted laser light according to an embodiment of the present invention, a harmonic fiber laser with a fundamental frequency of 1064 nm is provided. The power amplifier is made up of a large mode area (25 µm core diameter) Yb-doped polarization-maintaining gain fiber of length 3 m, cladding pumped by 90 W of 976 nm pump power sourced from fiber-coupled diode laser(s). The saturated emission of the power amplifier is nominally 60 or 70 W of average power when the master oscillator emits sufficient average power to saturate the amplifier. The power amplifier of this embodiment runs in saturated mode for a master oscillator input power range of greater than 0.5 W or greater than 1.0 W. The frequency conversion stage is a second harmonic conversion stage that converts the 1064 nm emission from the power amplifier into a wavelength of 532 nm. The harmonic conversion stage comprises a thermally-controlled 2 cm device of noncritically phase-matched LBO, input coupling lenses, output coupling lenses, and a wavelength separator that dumps the 1064 nm power remaining in the beam and transmits the 532 nm power.

The master oscillator emits 1 W of 1064 nm average power in 1 ns pulses at a repetition rate of 1 MHz when harmonic output is desired. The peak power of the master oscillator emission in the harmonic conversion mode is 1 kW. Note that the master oscillator may contain one or more stages of amplification. The power amplifier amplifies the master oscillator emission to 60 W average power and 60 kW peak power. The resulting 532 nm average power generated in the harmonic conversion stage is 30 W (50% conversion efficiency). In other embodiments, other average power levels are utilized as appropriate to the particular application.

When harmonic output is not desired, the master oscillator transmits 1 W of 1064 nm average power in CW mode, thus no pulsing occurs and the peak power is equal to the average power. The power amplifier is saturated since it has 1 W of average power input from the master oscillator and outputs 60 or 70 W average power with 60 or 70 W peak power (CW operation). The resulting 532 nm average power generated in the harmonic conversion stage is <1 mW. Thus, the harmonic output is effectively switched off while the amplifier continues to operate in a saturated mode. The 1064 nm emission of the power amplifier is not converted appreciably to 532 nm and is thus dumped at the wavelength separation means.

The master oscillator is made up of a 1064 nm seed laser diode followed by a 27 dB gain fiber amplifier. The diode laser emits an average power of 2 mW average power, resulting in a master oscillator emission of 1 W of average power. When harmonic output is desired, the diode laser emits 1 ns pulses at a repetition rate of 1 MHz. When harmonic output is not desired, the diode laser emits a continuous wave signal of 2 mW average power.

In some applications, it may be impractical or impossible to change the emission characteristics of the seed laser in the master oscillator. That is, in these applications, the seed laser can only be shut off. Embodiments of the present invention provide methods and systems to produce frequency converted light with predetermined output profiles in these applications. As described below, a second seed laser may be employed that is combined with the first laser using an optical combiner. The optical combiner may be in free space or confined within fiber. When harmonic output is desired, the first seed, which operates in a pulsed mode, is active while the second seed is inactive. When harmonic output is not desired, the first seed is inactive while the second seed operates in continuous wave mode. In both cases the power coupled from the master oscillator into the power amplifier is sufficient to saturate the power amplifier.

Figure 4:
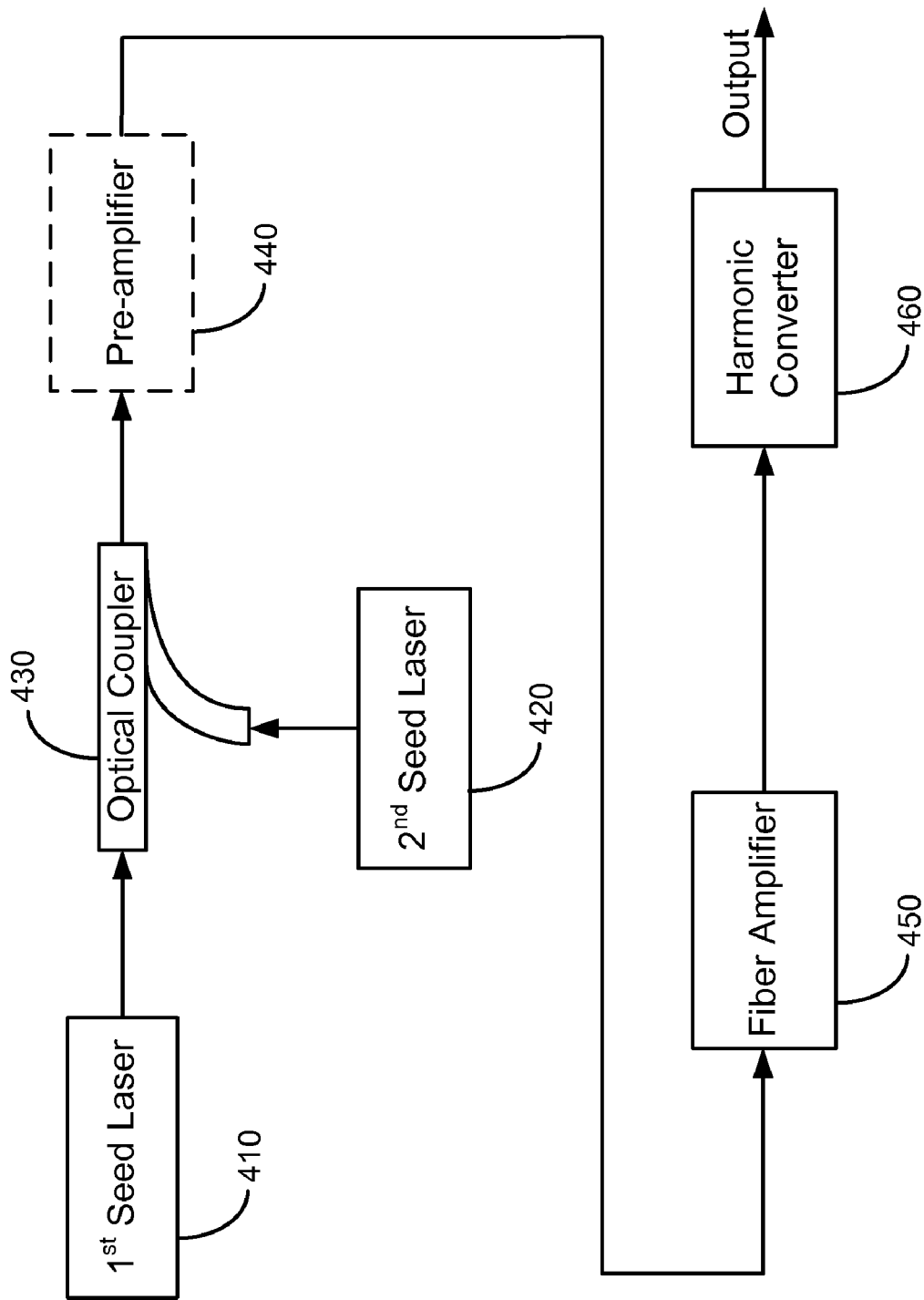
FIG. 4 is a simplified schematic diagram of a laser system according to an embodiment of the present invention.

FIG. 4 is a simplified schematic diagram of a laser system according to an embodiment of the present invention. As illustrated in FIG. 4, two seed lasers, a first seed laser 410 and a second seed laser 420 are used in the illustrated embodiment. In the embodiment illustrated in FIG. 4, the first seed laser is in the active state, emitting a 1 MHz pulsetrain of 1 ns pulses. The first seed laser 410 and a second seed laser 420 are combined using an optical combiner 430, for example, a 90%/10% fiber optic combiner or coupler. An optional pre-amplifier 440 associated with the seed lasers is illustrated in FIG. 4. Pre-amplifier 440, which provides a predetermined amount of amplification to the combined optical signal is not required in all embodiments of the present invention.

In an embodiment, the second seed laser 420 is a diode laser emitting 100 mW average power at 1060 nm wavelength with a linewidth of 1 nm. In another embodiment, the diode laser operates at a wavelength of 1030 nm. In embodiments utilizing an Yb gain medium, the second seed laser can operate to produce a range of wavelengths within the Yb gain bandwidth, for example, a wavelength ranging from about 1015 nm to about 1085 nm. In embodiments utilizing other gain medium, the second seed laser can operate to produce wavelengths within the gain bandwidth of the particular gain medium. When the second seed laser is active, the output power of the power amplifier stage 450 (illustrated in FIG. 4 as a fiber amplifier) contains predominantly the 1060 nm CW signal due to the greater average power of the 1060 nm signal input into the fiber amplifier. The output of the fiber amplifier 450 is frequency converted in the harmonic converter 460.

The resultant harmonic conversion efficiency of the combined 1060 nm and 1064 nm signals is greatly reduced from the 1064 nm signal due to the negligible conversion efficiency of the 1060 nm signal and the very low conversion efficiency of the lower power 1064 nm signal.

Note that the power coupled from the master oscillator section (including the first and second seed lasers, the optical coupler, and the optional pre-amplifier) to the power amplifier 450 need not be the same when either seed laser is active. The second seed laser 420 may emit light at a different wavelength, and thus have a different gain in the power amplifier 450. If this gain is higher than the gain at the wavelength of the first seed laser 410, less power is needed to saturate the power amplifier 450. A secondary benefit of using a second seed with sufficiently different wavelength is that the harmonic conversion efficiency will be greatly reduced if the wavelength of the second seed laser is outside of the spectral bandwidth of the harmonic conversion process performed in the harmonic converter 460. The reduction in harmonic conversion efficiency due to shifting the wavelength several nanometers can be several orders of magnitude depending on the frequency conversion crystal being used. A practical implementation of this in a Yb-doped fiber would be to use a first seed at 1064 nm wavelength that will be active when harmonic output is desired, and the second seed having a wavelength of 1030 nm that will be active when harmonic output is not desired. The gain in the Yb-doped fiber is slightly higher at a wavelength of 1030 nm than at 1064 nm when the gain fiber is sufficiently pumped to have a positive inversion.

Figure 5A:
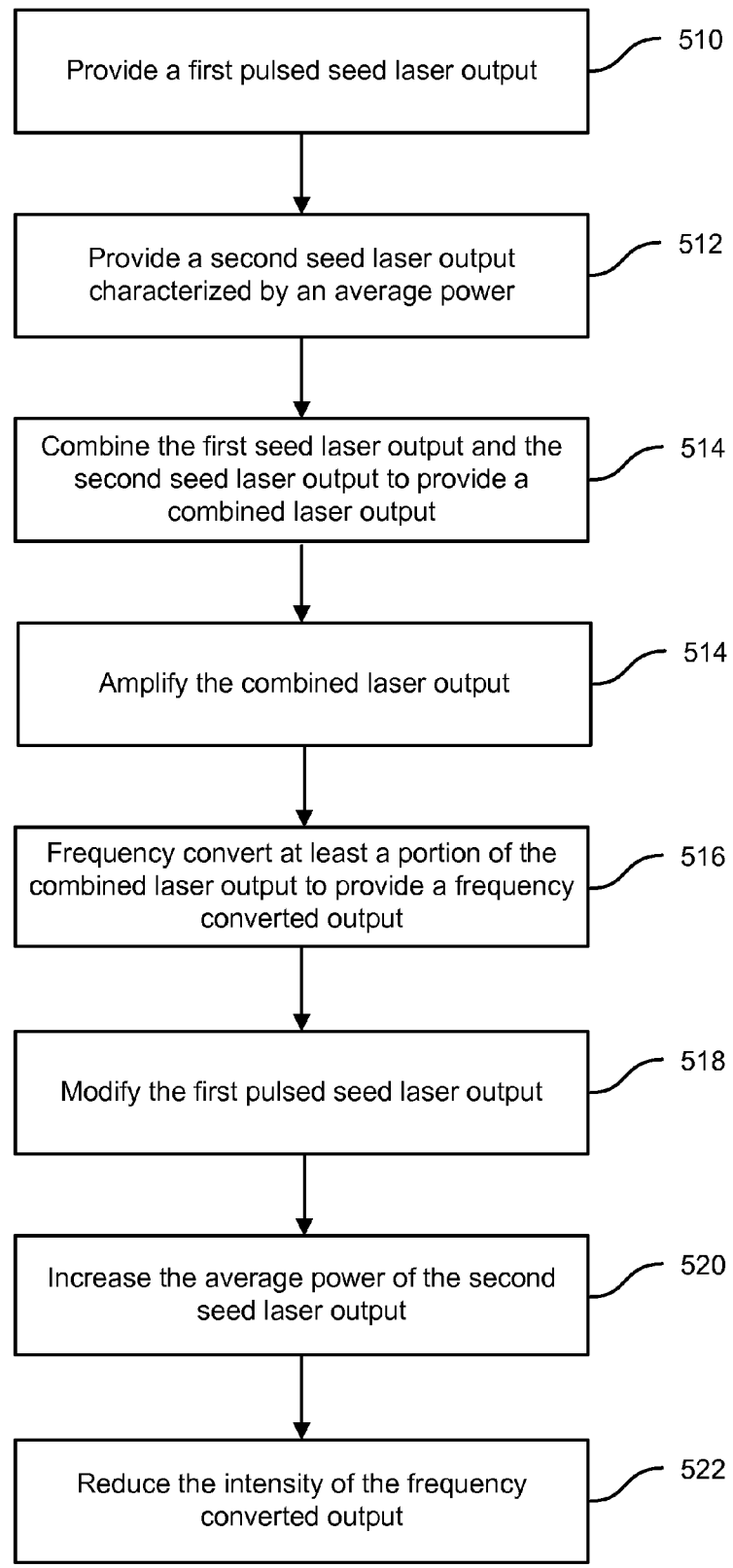
FIG. 5A is a simplified flowchart illustrating a method of providing a frequency converted output according to an embodiment of the present invention.

FIG. 5A is a simplified flowchart illustrating a method of providing a frequency converted output according to an embodiment of the present invention. The method includes providing a first pulsed seed laser output (510) and providing a second seed laser output (512). In some embodiments, the first and second seed laser outputs are referred to as seed signals. Typically, the power of the second seed laser signal is sufficiently low to enable frequency conversion of the first pulsed seed laser signal as described more fully below. The first seed laser operates at the fundamental wavelength and the second seed laser operates at a second wavelength that may be different from the fundamental wavelength. Thus, in the embodiment described in relation to FIG. 4, the fundamental wavelength is 1064 nm and the second wavelength is 1060 nm. The first pulsed seed laser output and the second seed laser output are combined using an optical combiner (514). The output of the optical combiner is a combined laser output including both the first seed signal and the second seed signal. As an example, the optical combiner can be a fiber coupler available from Opto-link of Kowloon, Hong Kong.

The combined laser output is amplified (514). The amplification at process 514 may be performed using a pre-amplifier, a power amplifier, or a combination thereof. Typically, the power amplifier used in amplifying the combined laser output is a fiber amplifier. At least a portion of the combined laser output is frequency converted to provide a frequency converted output (516). The portion of the combined laser output that is frequency converted is associated with the amplified first pulsed seed laser signal, thereby producing a train of frequency converted pulses.

In order to modify the laser system output and reduce the amplitude of the frequency converted laser signal, the first pulsed seed laser output is modified (518). In an embodiment, the first seed laser is switched from a pulsed mode of operation to a CW or quasi-CW mode of operation. As illustrated in FIGS. 2A and 2B, the frequency conversion efficiency of the CW signal is greatly reduced in comparison to the efficiency achieved using a pulsed input. Thus, switching of the first seed laser into the CW mode of operation reduces the intensity of the frequency converted output (522). In another embodiment, the amplitude of the pulses in the first pulsed seed laser signal is decreased, thereby decreasing the frequency conversion efficiency. In both embodiments, the intensity of the frequency converted output is reduced (522). In subsequent processes, the first seed signal can be modified again to provide a pulsed signal, thereby increasing the intensity of the frequency converted output. Thus, a series of pulse trains can be provided by embodiments of the present invention.

In order to maintain the total average power in the power amplifier 450 at a substantially constant level, the average power of the second seed laser output can be increased (520). Depending on the modifications made to the first seed laser output, this adjustment of the average power in the second seed laser output may or may not be needed. Thus, utilizing the method described in FIG. 5A, the power provided by the master oscillator section that is fed to the power amplifier 450 is constant as a function of time. When the average power of the first seed signal is reduced by reducing the amplitude of the pulses (for example to zero) or switching to a CW mode of operation, the second seed signal is accordingly increased to maintain the total power out of the master oscillator section at a constant level. One of ordinary skill in the art would recognize many variations, modifications, and alternatives.

It should be appreciated that the specific steps illustrated in FIG. 5A provide a particular method of providing a frequency converted output according to an embodiment of the present invention. Other sequences of steps may also be performed according to alternative embodiments. For example, alternative embodiments of the present invention may perform the steps outlined above in a different order. Moreover, the individual steps illustrated in FIG. 5A may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 5B shows data obtained using a laser system with two seed lasers according to an embodiment of the present invention. The data plotted in FIG. 5B(i) is the measured power versus time of the input into the power amplifier. During the beginning of the emission, the first seed is active and the input into the power amplifier is a pulsetrain. After about 9 nsec, the first seed is made inactive and the second seed is active, emitting a constant low level CW signal. Thus, the input into the power amplifier makes a transition at about the 9 ns point from a train of pulses to a substantially constant CW signal.

The data shown in FIG. 5B(ii) is the measured harmonic output power. In an embodiment, the harmonic output is at a wavelength of 532 nm, resulting from harmonic conversion in a second harmonic generation crystal that frequency converts the output of the power amplifier. As illustrated in FIG. 5B(ii), the data shows the pulse train emitted by the first seed being converted to 532 nm wavelength radiation. However, after the 9 ns point in time, the low level CW output of the second seed does not efficiently convert to the harmonic wavelength. Thus, there is substantially no harmonic output power after about the 9 ns point in time. It should be noted that the pulse shapes measured in the first plot and the second plot (i.e., FIG. 5B(i) and FIG. 5B(ii)) differ because two different detectors were used for the two measurements.

Figure 5C:
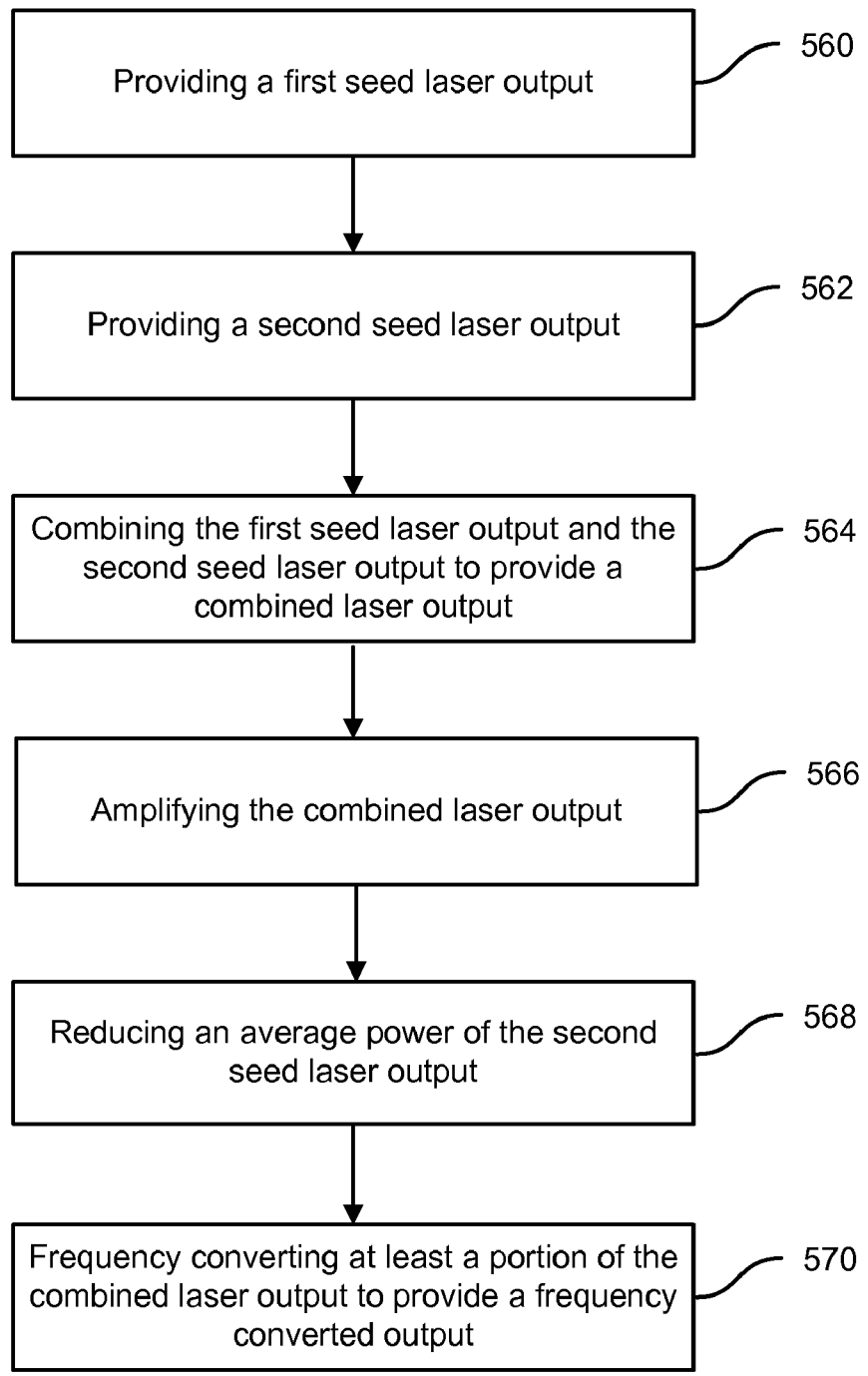
FIG. 5C is a simplified flowchart illustrating another method of providing a frequency converted output according to an embodiment of the present invention.

FIG. 5C is a simplified flowchart illustrating a method of providing a frequency converted output according to an embodiment of the present invention. This method can be utilized when it is impractical to turn off the first seed source, change the first seed source to a CW mode of operation, reduce the average power of the first pulsed seed source signal, or the like. As in the method described in relation to FIG. 5A, this method provides a way of modulating the frequency converted output to provide groups of trains of frequency converted pulses. The method includes providing a first seed laser output or signal (560) and providing a second seed laser output or signal (562). The first pulsed seed laser output and the second seed laser output are combined using an optical combiner (564), for example, a fiber coupler. The output of the optical combiner is a combined laser output including both the first seed signal and the second seed signal. The combined laser output is amplified using a pre-amplifier, a power amplifier (typically a fiber amplifier), or a combination thereof.

In this embodiment, the power of the second seed laser is sufficient to result in the harmonic conversion efficiency in the harmonic converter being low at the fundamental wavelength associated with the first seed laser signal. In some embodiments, this method is referred to as "gain swamping" since the gain in the power amplifier is substantially used to amplify the second seed signal, which has poor frequency conversion efficiency in comparison with the first seed signal, rather than to amplify the first seed signal. Thus, initially, the intensity of the frequency converted signal is low. In order to increase the intensity of the frequency converted signal, the average power of the second seed laser output is reduced (568). As a result, at least a portion of the combined laser output (i.e., the first seed laser signal) is frequency converted to provide a frequency converted output (570). In order to modulate the frequency converted output, the average power of the second seed laser can be increased or decreased as appropriate to provide a predetermined modulation to the frequency converted output.

In the method described in relation to FIG. 5C, in which gain swamping by the second seed laser signal is used to reduce the intensity of the frequency converted output, the first seed laser emission is always active. When the second seed laser is inactive, harmonic output is present. When the second seed laser is active, harmonic output is greatly reduced. The second seed laser has a sufficiently greater average power or greater gain in the fiber that results in a reduced gain for the signal emitted by the first seed laser. A qualitative way to understand this is that the highly saturated power amplifier emits approximately the same average power whether or not the second seed is active. When the second seed is active, the output power of the power amplifier is shared between the signals emitted by both seed lasers. If the gain at the second seed wavelength or the average power of the second seed are greater, than the emission from the second seed will reduce the gain experienced by the first seed.

Note that the emission characteristics of a laser in continuous wave mode can be much different than that laser operating in pulsed mode. This is particularly true with diode lasers. The spectral linewidth of a diode laser can be very narrow in continuous wave mode, but broadens out significantly when operating in pulsed mode. A significant limitation in fiber lasers and amplifiers is stimulated Brillouin scattering (SBS). This nonlinear impairment results in the backscattering of a large portion of the forward propagating light in a fiber laser or amplifier. It not only reduces the output emission of the amplifier, but the backward propagating power may cause component failures in the amplifier. The threshold for the SBS process increases with increasing spectral bandwidth of the light in the fiber laser or amplifier. Therefore, when no harmonic conversion is desired, the emission of the master oscillator must have sufficient spectral bandwidth to hold off SBS. In the example illustrated in FIG. 5A above this could be accomplished by modulating a diode seed laser at a very high duty cycle, thus dithering the frequency, when harmonic output is not desired, and generating a broader spectral bandwidth emission that still has low peak power. In the examples illustrated in FIG. 5A above, the second seed laser can be chosen to be multi-longitudinal mode laser that generates a broad spectral bandwidth even in CW operation, or the same dithering technique mentioned above.

Figure 5D:
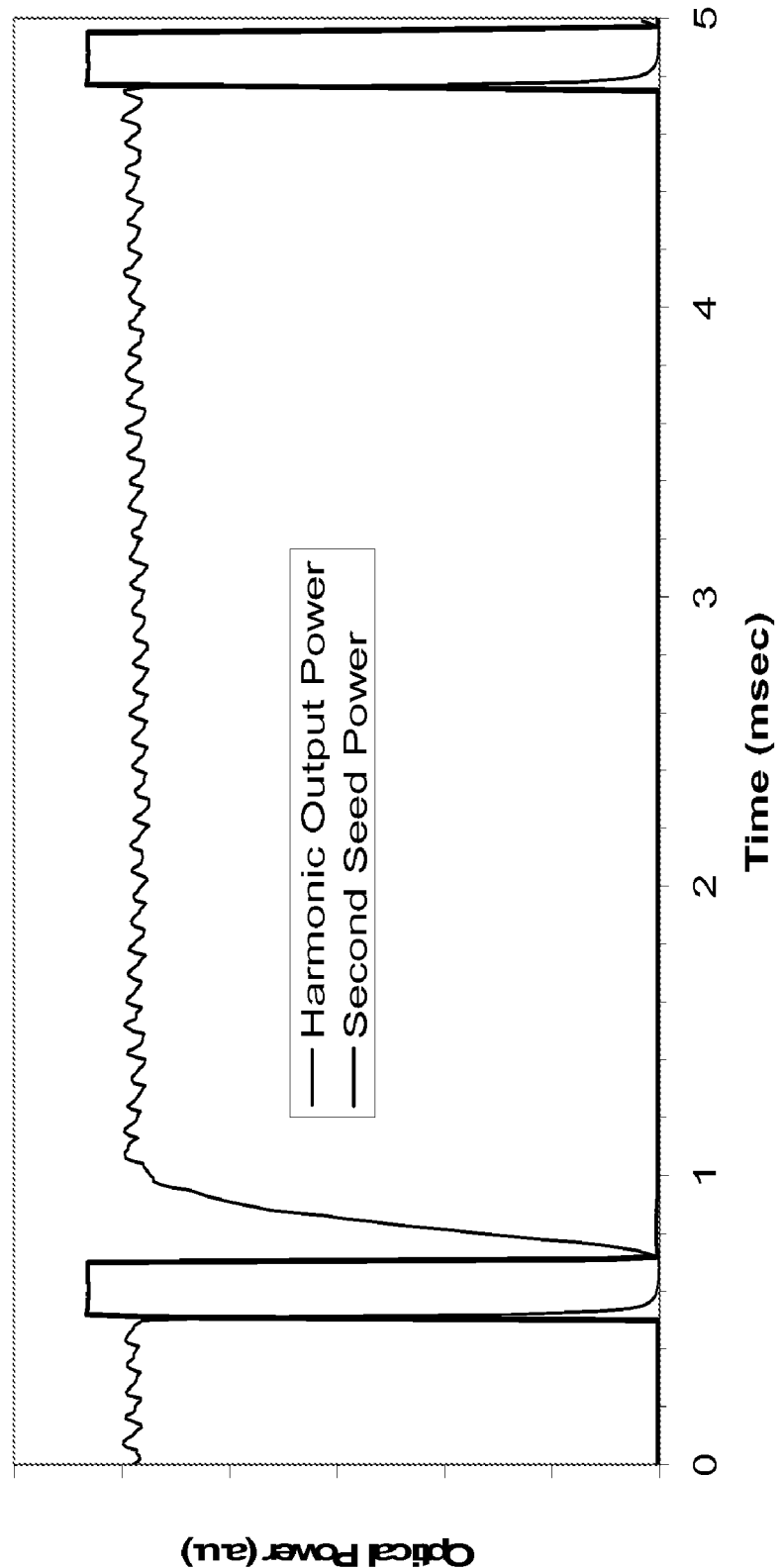
FIG. 5D shows data obtained using another laser system with two seed lasers according to an embodiment of the present invention.

FIG. 5D shows data obtained using another laser system with two seed lasers according to an embodiment of the present invention. In the plot shown in FIG. 5D, both the measured harmonic output power versus time (fine line) and the power of the second seed laser versus time (heavy line) are plotted for a two seed system in which the first seed laser is always on. Note that the timescale is much greater than the pulse-to-pulse temporal duration of the first seed output. Thus, the individual pulses do not appear on the plot, merely an envelope associated with the individual pulses.

At zero time, there is harmonic output from the laser system. At a time of about 500 μsec, the second seed laser is turned on as illustrated by the top-hat shaped heavy line. The second seed laser is left on for about 100 μsec. After the second seed is turned on, the harmonic output is decreased to a small level. The harmonic output remains in the substantially "off" state until the second seed laser is turned off at about 600 μsec.

It should also be noted that a lag time in the decrease and increase of the harmonic output power is measured. This rise and fall in the harmonic output power is believed to be due to the finite response of the gain medium to changes in input power level.

Figure 6:
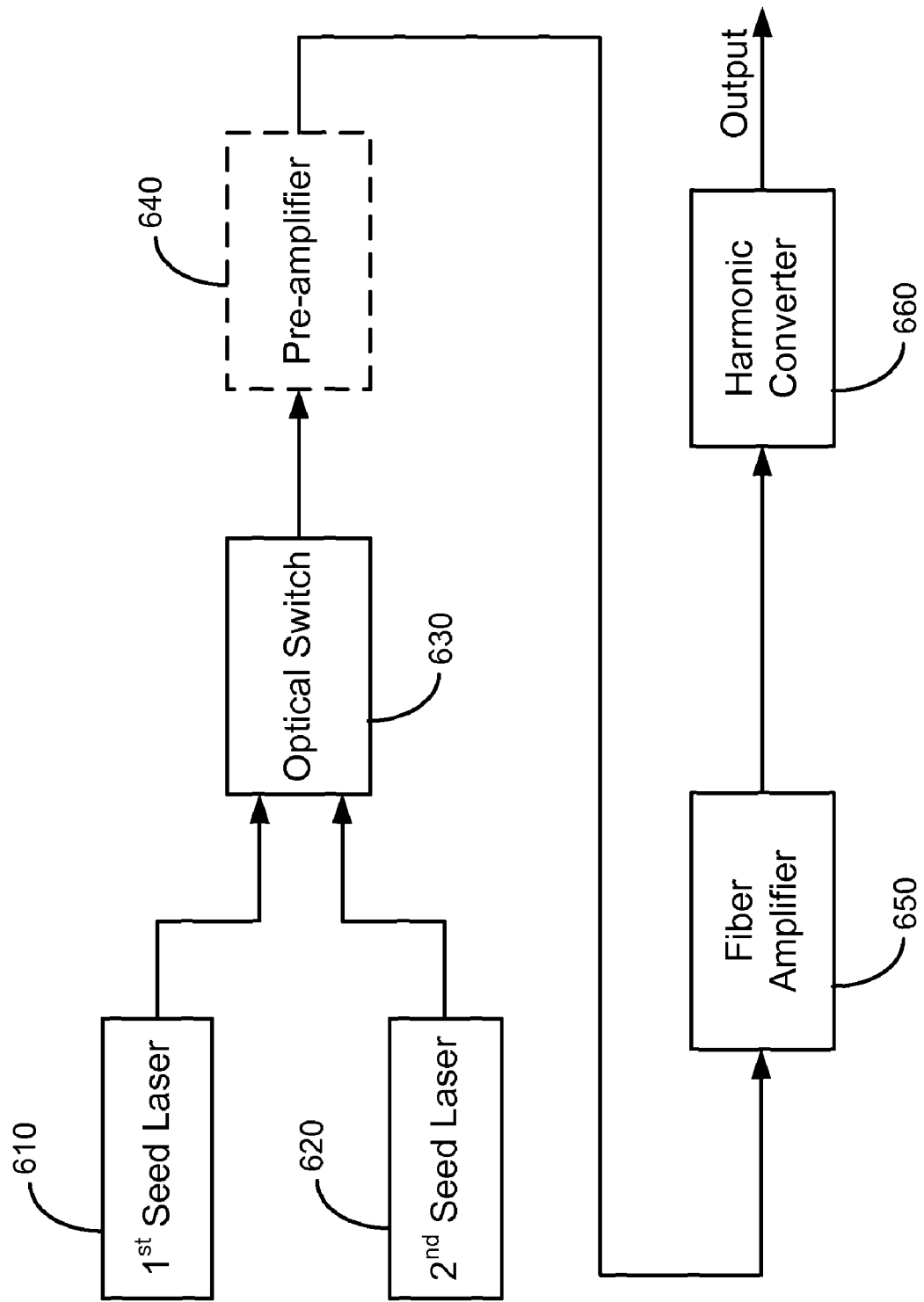
FIG. 6 is a simplified schematic diagram of a laser system according to another embodiment of the present invention.

FIG. 6 is a simplified schematic diagram of a laser system according to yet another embodiment of the present invention. In the embodiment illustrated in FIG. 6, two seeding lasers are utilized, both always on, but optically-switched between them using a fast optical switch, such as a Mach-Zehnder modulator. The first seed laser 610 is always on in an embodiment and emits light with an average power sufficient to saturate the fiber amplifier 650 after pre-amplification by pre-amplifier 640. The amplified seed produces a first power level of harmonic light in the harmonic converter 660 when the optical switch 630 transmits the first seed laser emission. The second seed laser 620 is always on in an embodiment and emits light with an average power sufficient to saturate the fiber amplifier 650 after pre-amplification by pre-amplifier 640. However, the second seed laser 620 produces a second power level of harmonic light in the harmonic converter 660 when the optical switch 630 transmits the second seed laser emission.

The second power level of harmonic light is much less than the first power level of harmonic light due to the second seed laser 620 emitting light with less peak power than the first seed laser 610 or at a different wavelength. In this way the harmonic output may be effectively turned on or off while keeping the fiber amplifier 650 saturated while both seed lasers are always on. The preamplifier may or may not be needed in the system depending on the average power output from the first seed laser 610 and the saturation characteristics of the fiber amplifier 650.

Figure 7:
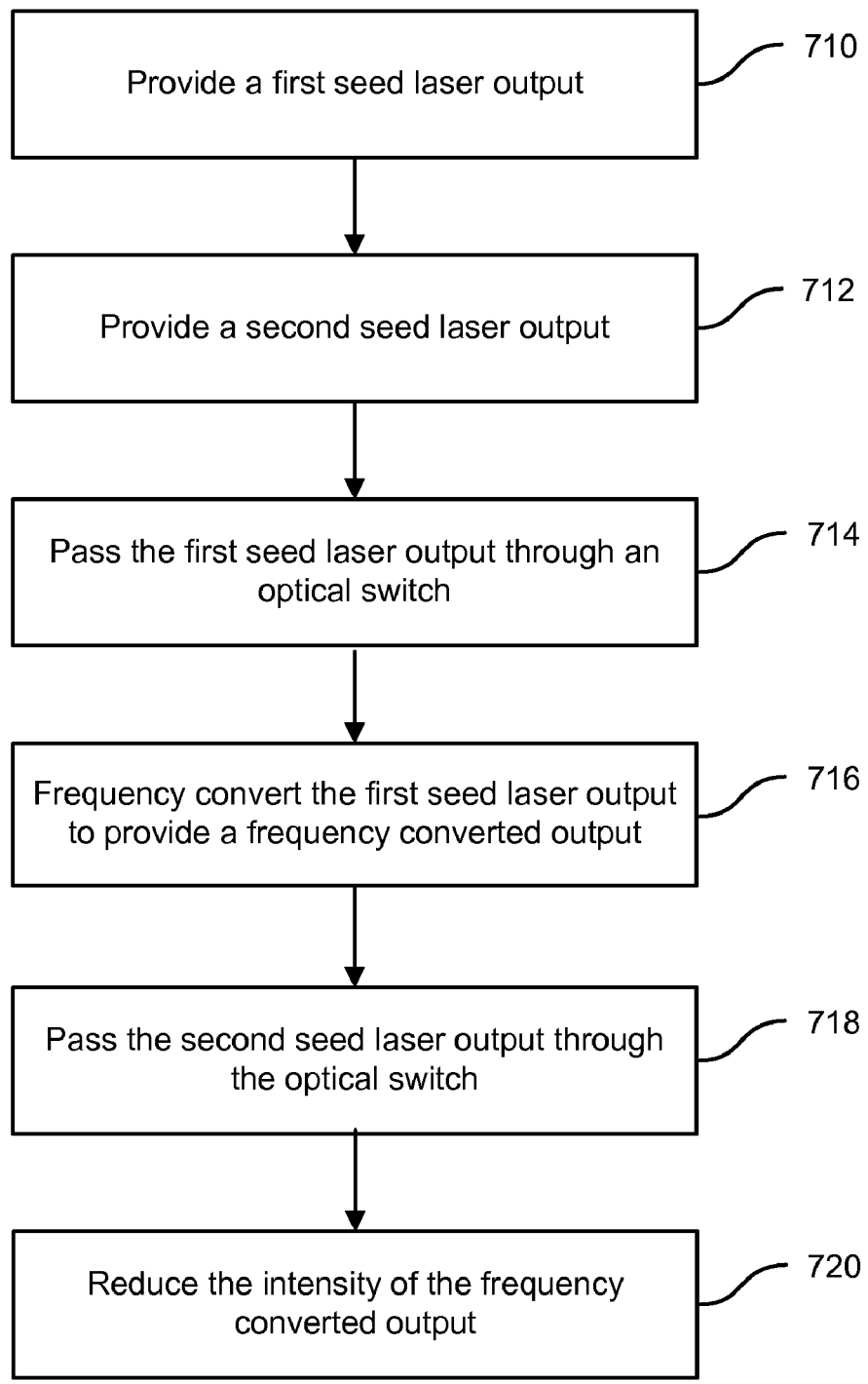
FIG. 7 is a simplified flowchart illustrating a method of providing a frequency converted output according to another embodiment of the present invention.

FIG. 7 is a simplified flowchart illustrating a method of providing a frequency converted output according to yet another embodiment of the present invention. The method includes providing a first seed laser output (710) and providing a second seed laser output (712). In some embodiments, the first and second seed laser outputs are referred to as seed signals. The first seed laser operates at the fundamental wavelength and the second seed laser operates at a second wavelength different from the fundamental wavelength. Thus, in an embodiment, the fundamental wavelength is 1064 nm and the second wavelength is 1030 nm. The first seed laser output is passed through an optical switch while the second seed laser output is blocked by the optical switch (714). In some embodiment, the optical switch is a high speed Mach-Zehnder modulator that is operable to select either of the first seed laser signals or the second seed laser signals in response to a user input. The optical switch is typically electrically connected to a computer or some other appropriate controller to actuate the optical switch and select one of the two inputs for transmission through the optical switch.

The signal transmitted through the optical switch is frequency converted (716) using the harmonic converter. As illustrated in FIG. 6, pre-amplification of the transmitted signal, amplification of the transmitted signal, or combinations thereof may be performed. The optical switch is actuated to pass the second seed laser output through the optical switch (718). Because the frequency conversion efficiency of the second seed laser signal is lower than the frequency conversion efficiency of the first seed laser signal, the intensity of the frequency converted output is reduced (720) in response to passing the second seed laser output through the optical switch. By modulating the seed signal transmitted through the optical switch, it is possible to generate a series of trains of frequency converted pulses, with the envelope of the pulse trains being selected by the operator.

It should be appreciated that the specific steps illustrated in FIG. 7 provide a particular method of providing a frequency converted output according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple substeps that may be performed in various sequences as appropriate to the individual step. Furthermore, additional steps may be added or removed depending on the particular applications. One of ordinary skill in the art would recognize many variations, modifications, and alternatives.

It is worthwhile to note that while the method described herein provides utility in creating arbitrary pulsetrains of frequency converted light, it may also be used to protect the power amplifier from a seed laser failure. When the laser system detects an unplanned absence of power from one of the source lasers in the master oscillator, the secondary source laser can be turned on very quickly to avoid damage in the power amplifier.

Many other embodiments of this invention can be imagined by one with ordinary skill in the art. These may include, but are not limited to, three stages of frequency conversion to generate the fifth harmonic (213 nm) from the 1064 nm emission of a Yb gain medium, the use of Er or Er/Yb doping in the gain fiber to generate a fundamental wavelength in the 1550 nm region and thus produce its harmonics. One of ordinary skill in the art would recognize many variations, modifications, and alternatives.

Figure 8:
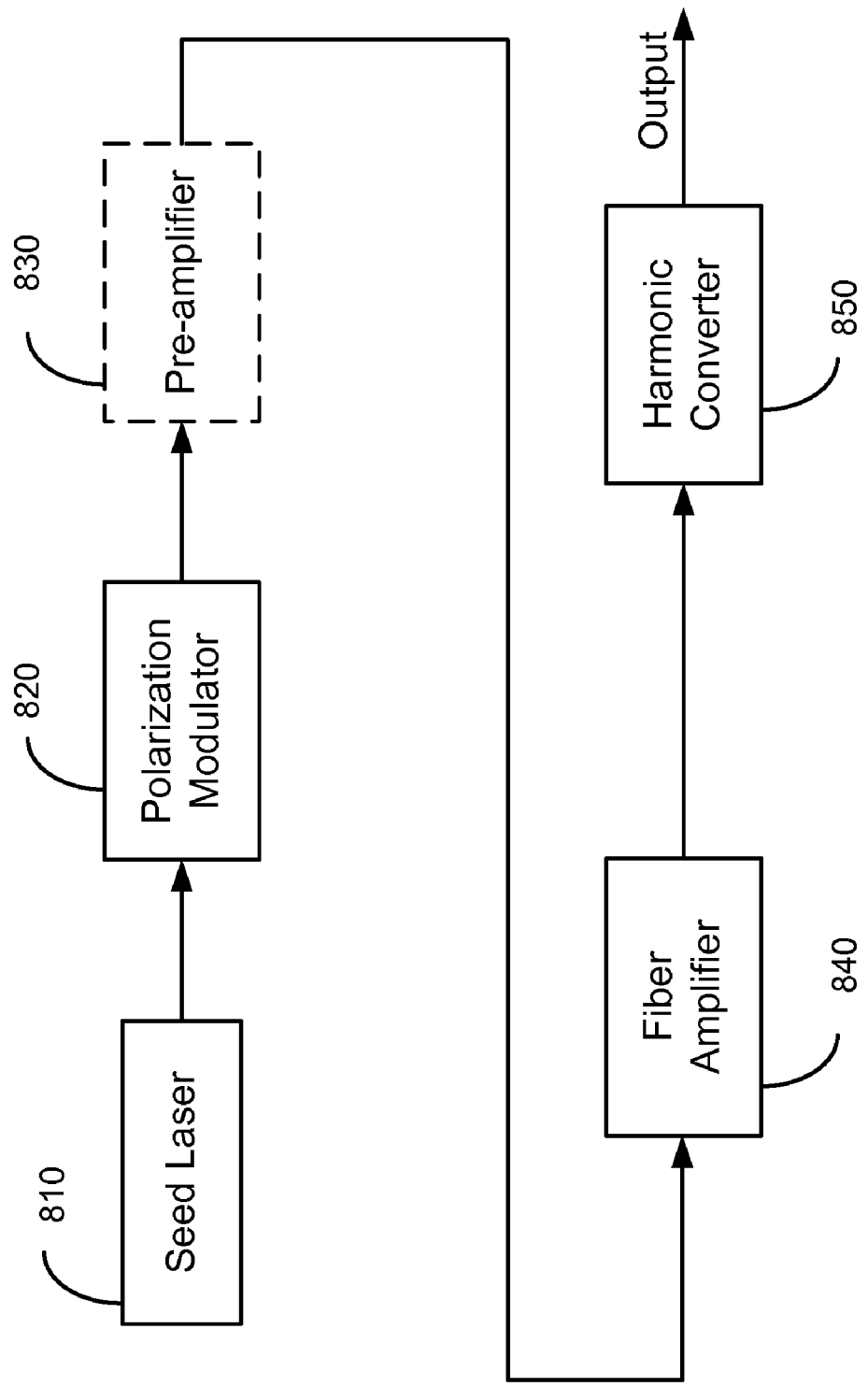
FIG. 8 is a simplified schematic diagram of a laser system according to another embodiment of the present invention.

FIG. 8 is a simplified schematic diagram of a laser system according to another embodiment of the present invention. In the embodiment illustrated in FIG. 8, a single seed laser 810 is utilized and always on. The seed laser emission passes through a polarization modulator 820 that changes the polarization state of the seed laser emission with time between a first polarization state and a second polarization state, for example rotating a linear polarization by 90°. An example of a polarization modulator 820 is a voltage driven Pockels cell. The output of the polarization modulator 820 then is amplified by pre-amplifier 830.

The output of the pre-amplifier 830 is then amplified by the fiber amplifier 840. The average output power of the seed laser 810 and resulting amplified emission from the pre-amplifier 830 is of high enough power to saturate fiber amplifier 840. The pre-amplifier 820 may or may not be needed in the system depending on the average power output from the seed laser 810 and the saturation characteristics of the fiber amplifier 840. The harmonic converter 850 converts the output emission of the fiber amplifier 840 to the harmonic wavelength with greater efficiency when the polarization modulator 820 outputs light in the first polarization state than when it outputs light in the second polarization state. Thus, the harmonic output of the laser system may be effectively turned on or off by switching the polarization modulator between its two states. Note that in some embodiments, it is necessary that the pre-amplifier 830 and fiber amplifier 840 not randomize the polarization of the emission from the polarization modulator 820.

In an embodiment, the first state of polarization is a linear polarization with 0° orientation and the second polarization state is linear but with a 90° orientation with respect to the first orientation. The pre-amplifier 820 and fiber amplifier 840 are typically made from polarization preserving fibers. The harmonic converter 850 is made up of a Type I second harmonic generation crystal with coupling optics that will produce harmonic light when the polarization of emission from the fiber laser is orientated 0° from its optical axis and does not produce harmonic light when the orientation is 90° from its optical axis.

A fourth related modulation method would make use of the master oscillator to change the polarization of the emission when harmonic output is not desired. If the power amplifier is polarization independent, the amplifier will stay saturated. In the case of a Type I nonlinear optical conversion process, rotation of the polarization by 90° will effectively shut off the nonlinear conversion process.

Figure 9:
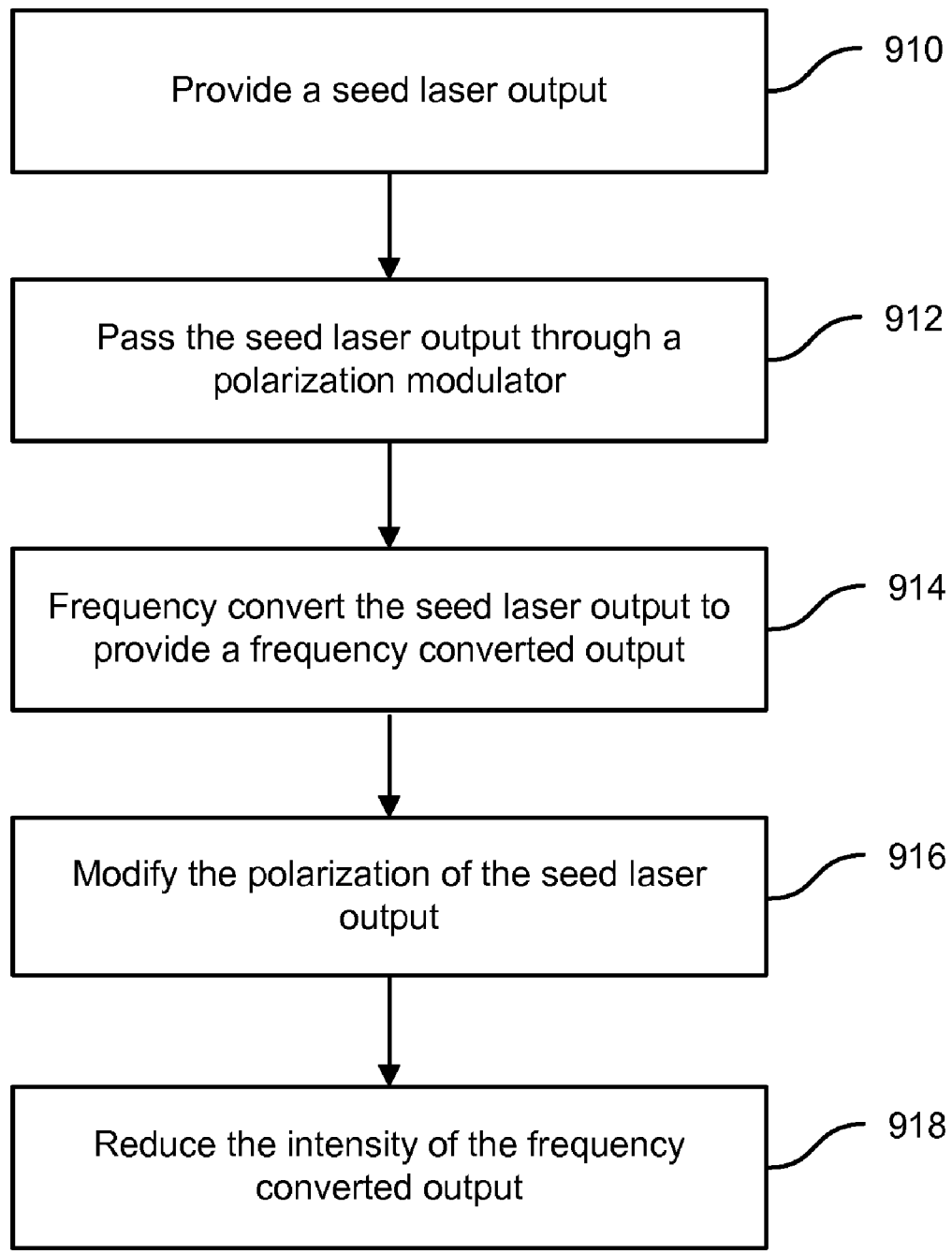
FIG. 9 is a simplified flowchart illustrating a method of providing a frequency converted output according to an alternative embodiment of the present invention.

FIG. 9 is a simplified flowchart illustrating a method of providing a frequency converted output according to another embodiment of the present invention. The method includes providing a seed laser output or signal (910). In the embodiment illustrated in FIG. 9, a single seed laser is utilized operating at a wavelength that is suitable for frequency conversion. The seed laser output is passed through a polarization modulator (912). The polarization modulator will either modify the polarization of the seed laser output or leave the polarization in the same state depending on the particular system design. Initially, the polarization state of the seed laser transmitted through the polarization modulator will be suitable for frequency conversion and the seed laser output will be frequency converted to provide a frequency converted output (914).

In order to reduce the intensity of the frequency converted output, the polarization of the seed laser output will be modified using the polarization modulator (916). In the modified state, the polarization of the seed laser beam will not be as suitable for frequency conversion, thereby reducing the intensity of the frequency converted output (918). In order to modulate the frequency converted output, the polarization modulator can be utilized to alternately change the polarization state of the seed laser beam in order to provide a predetermined modulation to the frequency converted output. One of ordinary skill in the art would recognize many variations, modifications, and alternatives.

It should be appreciated that the specific steps illustrated in FIG. 9 provide a particular method of providing a frequency converted output according to an embodiment of the present invention. Other sequences of steps may also be performed according to alternative embodiments. For example, alternative embodiments of the present invention may perform the steps outlined above in a different order. Moreover, the individual steps illustrated in FIG. 9 may include multiple substeps that may be performed in various sequences as appropriate to the individual step. Furthermore, additional steps may be added or removed depending on the particular applications. One of ordinary skill in the art would recognize many variations, modifications, and alternatives.

It is worthwhile to note that while the method described herein provides utility in creating arbitrary pulsetrains of frequency converted light, it may also be used to protect the power amplifier from a seed laser failure. When the laser system detects an unplanned absence of power from one of the source lasers in the master oscillator, the secondary source laser can be turned on very quickly to avoid damage in the power amplifier.

Many other embodiments of this invention can be imagined by one with ordinary skill in the art. These may include, but not limited to, three stages of frequency conversion to generate the fifth harmonic (213 nm) from the 1064 nm emission of a Yb gain medium, the use of Er or Er/Yb doping in the gain fiber to generate a fundamental wavelength in the 1550 nm region and thus produce its harmonics. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for producing frequency converted light, the system comprising:
   a seed laser operable to provide a seed laser signal characterized by a pulsed profile;
   a second seed laser operable to provide a second seed laser signal;
   a power amplifier optically coupled to the seed laser and the second seed laser and operable to provide an amplified seed laser signal;
   a harmonic converter optically coupled to the power amplifier; and
   a controller coupled to the second seed laser and operable to drive the second seed laser in response to a decrease in the seed laser signal, wherein an average power of the amplified seed laser signal is substantially constant.

2. The system of claim 1 wherein the seed laser comprises a semiconductor laser.

3. The system of claim 1 wherein the power amplifier comprises a fiber amplifier.

4. The system of claim 1 wherein the harmonic converter comprises a nonlinear optical element.

5. The system of claim 1 wherein the average power of the amplified seed laser signal varies less than 50% for the pulse profile.

6. The system of claim 5 wherein the average power of the amplified seed laser signal varies less than 20% for the pulse.

7. The system of claim 1 further comprising a pre-amplifier optically coupled to the seed laser and the power amplifier.

8. A system for producing frequency converted light, the system comprising:
   a first seed laser operable to provide a first pulsed laser signal at a first wavelength;
   a second seed laser operable to provide a second laser signal at the first wavelength;
   an optical combiner optically coupled to the first seed laser and the second seed laser and operative to combine the first pulsed laser signal and the second laser signal into a combined laser signal;
   a power amplifier optically coupled to the optical combiner, wherein an intensity of both the first laser pulsed signal and the second laser signal are increased by the power amplifier; and
   a harmonic converter optically coupled to the power amplifier.

9. The system of claim 8 further comprising a controller coupled to at least one of the first seed laser or the second seed laser.

10. The system of claim 9 wherein the controller comprises a computer-readable medium storing a plurality of instructions for controlling a data processor, the plurality of instructions comprising:
    instructions that cause the data processor to decrease an average power of the first seed laser;
    instructions that cause the data processor to increase an average power of the second seed laser; and
    instructions that cause the data processor to maintain an output of the power amplifier at a substantially constant level.

11. The system of claim 10 wherein the average power of the first seed laser is decreased by modifying the first pulsed laser signal from a pulsed temporal profile to a CW temporal profile.

12. The system of claim 10 wherein the average power of the first seed laser is decreased by modifying the first pulsed laser signal from a first pulsed temporal profile to a second pulsed temporal profile characterized by a lower pulse amplitude.

13. The system of claim 8 wherein the first seed laser comprises a semiconductor laser operable to produce radiation at about 1064 nm.

14. The system of claim 8 wherein the second seed laser comprises a semiconductor laser operable to produce radiation at about 1064 nm.

15. The system of claim 8 wherein the optical combiner comprises a fiber coupler.

16. The system of claim 8 further comprising a pre-amplifier optically coupled to the optical combiner and the power amplifier.

17. A method of producing a frequency converted output, the method comprising:
    providing a first pulsed seed signal having a first wavelength;
    providing a second seed signal having the first wavelength;
    combining the first pulsed seed signal and the second seed signal to provide a combined laser output;
    amplifying the combined laser output to provide an amplified combined laser output characterized by an average power;
    frequency converting at least a portion of the amplified combined laser output; and
    modifying the first pulsed seed signal, wherein the average power is maintained at a substantially constant level.

18. The method of claim 17 wherein the at least a portion of the amplified combined laser output comprises the amplified first pulsed seed signal.

19. The method of claim 17 wherein the substantially constant level is maintained within 50%.

20. The method of claim 18 wherein the substantially constant level is maintained within 20%.

21. The method of claim 17 wherein modifying the first pulsed seed signal comprises generating a CW seed signal.

22. A method of producing a frequency converted output, the method comprising:
providing a first pulsed seed signal having a first wavelength;
providing a second seed signal characterized by an average power and the first wavelength;
combining the first pulsed seed signal and the second seed signal to provide a combined laser signal;
reducing the average power of the second seed laser output; and
frequency converting the first seed laser output to produce the frequency converted output.

23. The method of claim 22 further comprising amplifying the combined laser signal.

24. The method of claim 23 wherein amplifying the combined laser output comprises using a fiber amplifier operating in a saturated mode of operation.

25. The method of claim 24 wherein the saturated mode of operation is characterized by an output power that changes less than 1 dB in response to a change of input power of 3 dB.

26. The method of claim 22 wherein the first seed laser output is characterized by a wavelength of about 1064 nm and the second seed laser output is characterized by a wavelength of about 1064 nm.

27. The method of claim 22 wherein combining the first seed laser output and the second seed laser output comprises using a fiber combiner.

28. The method of claim 22 wherein the average power of the second seed signal is reduced by greater than about 90%.

29. The method of claim 22 wherein the frequency converted output comprises a second harmonic of the first seed laser output.

30. The method of claim 22 wherein the frequency converted output comprises at least one of a second or third harmonic of the first seed laser output.

* * * * *